United States Patent
Takano et al.

(10) Patent No.: US 7,486,230 B2
(45) Date of Patent: Feb. 3, 2009

(54) REFLECTED WAVE POWER ESTIMATION DEVICE IN A RADAR SIGNAL PROCESSOR

(75) Inventors: Gaku Takano, Kanagawa-ken (JP); Chiharu Yamano, Tokyo (JP); Kazuma Natsume, Oobu (JP); Yasuyuki Miyake, Toyota (JP)

(73) Assignee: Denso Corporation (JP)

( * ) Notice: Subject to any disclaimer, the term of this patent is extended or adjusted under 35 U.S.C. 154(b) by 8 days.

(21) Appl. No.: 11/605,993

(22) Filed: Nov. 29, 2006

(65) Prior Publication Data

US 2007/0120730 A1 May 31, 2007

(30) Foreign Application Priority Data

Nov. 30, 2005 (JP) ............................. 2005-345709

(51) Int. Cl.
*G01S 7/02* (2006.01)
*G01S 13/93* (2006.01)

(52) U.S. Cl. .................... 342/189; 342/70; 342/147; 342/175; 342/195

(58) Field of Classification Search ................ 342/189, 342/70–72, 147–158, 175, 195
See application file for complete search history.

(56) References Cited

U.S. PATENT DOCUMENTS

| | | | | |
|---|---|---|---|---|
| H374 H | * | 11/1987 | Abo-Zena et al. ........... | 342/378 |
| 5,525,997 A | * | 6/1996 | Kwon ........................ | 342/174 |
| 5,990,834 A | * | 11/1999 | Barrick et al. .............. | 342/418 |
| 6,504,490 B2 | * | 1/2003 | Mizushima ................. | 340/943 |
| 6,584,211 B1 | * | 6/2003 | Amemiya et al. ........... | 382/103 |
| 6,907,270 B1 | * | 6/2005 | Blanz ....................... | 455/562.1 |
| 2003/0020650 A1 | * | 1/2003 | Chevalier et al. ........... | 342/378 |
| 2008/0122681 A1 | * | 5/2008 | Shirakawa .................. | 342/147 |

FOREIGN PATENT DOCUMENTS

JP 2004-198218 7/2004

OTHER PUBLICATIONS

Harry L Van Trees: "Optimum Array Processing Part IV of Detection, Estimation, and Modulation Theory." pp. 828 through 841, 984 through 991, 1000, 1001, and 1154 through 1195.
Nobuo Kikuma: "Adaptive Antenna Technique," published Oct. 10, 2003 by Ohmsha (JP).

* cited by examiner

*Primary Examiner*—Thomas H Tarcza
*Assistant Examiner*—Cassi Galt
(74) *Attorney, Agent, or Firm*—Robert F. Zielinski; Buchanan Ingersoll & Rooney PC

(57) ABSTRACT

A radar signal processor has observation means for outputting a predetermined observation signal from a reflected wave, means for extracting an observation signal component concerning a target from the observation signal, means for computing a sample correlation matrix showing a correlation characteristic between the observation means from the observation signal components, means for estimating power of the reflected wave from the sample correlation matrix, and an array response matrix which is comprised of response vectors of the reflected waves. When estimating the power, an adjacent azimuth array response matrix having only the reflected waves of a predetermined arrival direction which power is to be estimated and the reflected waves of an azimuth adjacent to the reflected wave as elements is determined so as to estimate the power of the reflected wave.

6 Claims, 8 Drawing Sheets

REFLECTED WAVE POWER ESTIMATION DEVICE IN A RADAR SIGNAL PROCESSOR

This application claims benefit of priority to Japanese Patent Application No. 2005-345709 filed on Nov. 30, 2005.

BACKGROUND OF THE INVENTION

This invention relates to a radar signal processor suitable for a vehicle-mounted array radar apparatus having two or more antenna components.

A conventionally known vehicle-mounted array radar apparatus judges presence or velocity of a preceding target which exists in a forward direction by estimating a power of a reflected wave from the target in order to prevent a collision and maintain the inter-vehicle distance with respect thereto (see a Japanese patent application publication number of which is 2004-198218).

A power estimating portion of such kind of the vehicle-mounted array radar apparatus may have two or more observation means, observation signal component extracting means, a sample correlation matrix computing portion, and a power estimating means according to maximum likelihood method.

A conventional array radar 1 as shown in FIG. 2 is comprised of observation means OBs 1 through K, observation signal component extracting means SDs 1 through K, sample correlation matrix computing means HG and power estimating means according to maximum likelihood method PG.

The observation means OB, p (array element p=1, 2, ... K) obtains an observation signal S3 including information, such as an arrival azimuth of a reflected wave and a power thereof, from a transmitting signal which is a radar and a received signal received from an antenna. Observation signals XTp(t1), XTp(t2), XTp(t3), ... , XTp(tM) which are sampled at times t1, t2, ... tM are outputted from the observation means p (array element p=1, 2, ... K), as shown in FIG. 2. M numbers of the observation signals which are sampled at times t1, t2, ... tM is referred to as one snapshot. The observation means OBs, 1 through K correspond to array components 1 through K. A linear array has been known as a physical arrangement of the array components.

A case of a FMCW radar is now exemplarily mentioned. The observation means OB of a FMCW radar 4 is comprised of an oscillator 2, a transmitting amplifier 3, a transmitting antenna 5, a receiving antenna 6, a receiving amplifier 7, a distributor, a mixer 9, a filter 10, and A/D converter 11, as shown in FIG. 3. The oscillator 2 oscillates millimetric-wave signals as a transmitting signal S2 which are modulated such that the frequency increases and decreases linearly with passage of time to form a triangular wave form, and the millimetric-wave signals are emitted as the transmitted signal S2 via the transmitting amplifier 3 and the transmitting antenna 5. At the same time, the reflected wave of the transmitted signal S2 is received as a received signal S1 through the receiving antenna 6. After amplifying the signal S1 by the receiving amplifier 7, it is mixed with the transmitted signal S2 by the distributor and the mixer 9. The mixed signal is filtered by the filter 10, and converted into a digital signal by the A/D converter 11 so as to be sampled. This sampled signal is the observation signal S3 outputted by the observation means. Although the array radar has a plurality of the observation means OB as shown in FIG. 2, the transmitted signals S2 in the respective observation means are common.

A case of a pulse radar which is another instance is now mentioned. The observation means OB of a pulse radar 12 is comprised of an oscillator 13, the transmitting amplifier 3, the transmitting antenna 5, the receiving antenna 6, the receiving amplifier 7, a phase detector 15, the filter 10 and the A/D converter 11, as shown in FIG. 4. The oscillator 13 oscillates pulses which are obtained by dividing a signal having high frequency f0 every equal interval at a cycle of fr[Hz], and the transmitted signal S2 is emitted through the transmitting amplifier 3 and the transmitting antenna 5 (pulse transmission). At the same time, the reflected wave of the transmitted signal S2 is received as a received signal S1 through the receiving antenna 6. After amplifying the signal S1 by the receiving amplifier 7, it is detected by the phase detector 15, and is filtered by the filter 10. The signal is converted into the digital signal by the A/D converter 11 which is triggered by pulse transmission, and the digital signal is sampled. This sampling signal is the observation signal S3 which the observation means outputs. Similar to the FMCW radar, the transmitted signals S2 used in the respective observation means are common.

The observation signal component extracting means SD, p (array component p=1, 2, ... K) as shown in FIG. 2 extracts an observation signal processing component XRp for subsequent stage from the observation signals S3, XTp(t1), XTp(t2), XTp(t3), ... XTp(tM) of one snapshot which are outputted from the observation means OB, p.

For instance, a case of a FMCW radar is now mentioned. When a target having velocity V exists at a position of distance r, the observation signals S3, XTp(t1), XTp(t2), XTp(t3), ... XTp(tM) of the FMCW radar include a frequency component of fB[Hz] as shown below.

[Expression 1]

$$f_B = \frac{4 \cdot \Delta F}{V_C \cdot T_m} \cdot r \pm \frac{2 \cdot F_0}{V_C} \cdot V \quad [Hz] \quad (1)$$

(+: at the time of modulation by increasing frequency,

−: at the time of modulation by decreasing frequency)

where r denotes distance to a target, V denotes relative velocity of a target, Vc is light speed, $\Delta F$ is frequency deviation width of frequency modulation, Tm denotes cycle period of frequency modulation, and Fo denotes central transmitting frequency. (Correctly speaking, "distance r" is a half of a distance from the transmitting antenna 5 up to the receiving antenna 6 via a target. But, the distance r from the receiving antenna 6 is adopted as "distance r", provided that the transmitting antenna 5 and the receiving antenna 6 are positioned at the same position. This explanation is applied to all descriptions in the present specification when referring to the distance up to a target r.) If relative velocity is neglected, the following relation which is shown hereinafter is given between distance r and frequency fB.

[Expression 2]

$$f_B = \frac{4 \cdot \Delta F}{V_C \cdot T_m} \cdot r \quad [Hz] \quad (2)$$

If the frequency components fb corresponding to distance r are obtained from the observation signals XTp(t1), XTp(t2), XTp(t3), ... XTp(tM) which are time series signals, the thus extracted are the observation signal components XRp for distance r. Fourier transformation or filtering with a band-pass filter is used as a method for extracting frequency components.

Besides, a case of a pulse radar is mentioned as another instance. If a target exists at the distance r, an echo from the target is observed in the observation signal S3 at a time

[Expression 3]

$$t_e = \frac{2}{V_C} \cdot r \quad (3)$$

from a time when emitting a pulse where r denotes distance to the target, and Vc denotes light speed. If the observation signals S3, XTp(t1), XTp(t2), XTp(t3), . . . XTp(tM) are sampled at echo starting times te corresponding to distances r, the thus extracted are the observation signal components XRp for distance r. Such sampling may be conducted after simple sampling or average filtering.

The sample correlation matrix computing means computes a sample correlation matrix Cxx which is a sampled value of a correlation matrix Rxx which represents a correlation characteristics of the signals between the array components (coherence) from output signals XR1, XR2, . . . XRK of the observation signal component extracting means SD, 1 through K, which is obtained by each array component. An observation signal component vector XR is defined by next Expression.

[Expression 4]

$$X_R \triangleq \begin{bmatrix} X_{R1} \\ \vdots \\ X_{Ri} \\ \vdots \\ X_{RK} \end{bmatrix} = [X_{R1} \ldots X_{Ri} \cdots X_{RK}]^T \quad (4)$$

A superscript T represents a transposition. The correlation matrix Rxx is defined by next Expression. On this occasion, the correlation matrix Rxx is a complex matrix with K rows and K columns, and a component with i-th row and j-th column is represented by rxxqij.

[Expression 5]

$$R_{xx} = \begin{bmatrix} r_{xx1i} & \cdots & r_{xx1j} & \cdots & r_{xx1K} \\ \vdots & & \vdots & & \vdots \\ r_{xxi1} & \cdots & r_{xxij} & \cdots & r_{xxiK} \\ \vdots & & \vdots & & \vdots \\ r_{xxK1} & \cdots & r_{xxKj} & \cdots & r_{xxKK} \end{bmatrix} \quad (5)$$

$$\triangleq E[X_R \cdot X_R^H]$$

-continued $$\triangleq \begin{bmatrix} E[X_{R1} \cdot X_{Ri}^*] & \cdots & E[X_{R1} \cdot X_{Rj}^*] & \cdots & E[X_{R1} \cdot X_{RK}^*] \\ \vdots & & \vdots & & \vdots \\ E[X_{Ri} \cdot XR1^*] & \cdots & E[X_{Ri} \cdot X_{Rj}^*] & \cdots & E[X_{Ri} \cdot X_{RK}^*] \\ \vdots & & \vdots & & \vdots \\ E[X_{RK} \cdot X_{R1}^*] & \cdots & E[X_{RK} \cdot X_{Rj}^*] & \cdots & E[X_{RK} \cdot X_{RK}^*] \end{bmatrix}$$

The superscript H represents a conjugate transpose. The superscript * represents a complex conjugate. E [ ] represents an operation for obtaining an expected value.

Since the sample correlation matrix Cxx is calculated in snapshots, the sample correlation matrix after a first snapshot is represented by Cxx(1), and the sample correlation matrix after a second snapshot is represented by Cxx(2), . . . and the sample correlation matrix after a m-th snapshot is represented by Cxx (m). Similar expression is used for the correlation matrix, the observation signal component, and the observation signal component vector etc., also.

With such kind of expression method, a correlation matrix observation value in the m-th snapshot Rtmp_xx(m) is calculated by next Expression.

[Expression 6]

$$R_{tmp\_xx}(m) = \begin{bmatrix} r_{tmp\_xx11}(m) & \cdots & r_{tmp\_xx1j}(m) & \cdots & r_{tmp\_xx1K}(m) \\ \vdots & & \vdots & & \vdots \\ r_{tmp\_xxi1}(m) & \cdots & r_{tmp\_xxij}(m) & \cdots & r_{tmp\_xxiK}(m) \\ \vdots & & \vdots & & \vdots \\ r_{tmp\_xxKi}(m) & \cdots & r_{tmp\_xxKj}(m) & \cdots & r_{tmp\_xxKK}(m) \end{bmatrix} \quad (6)$$

$$\triangleq X_R(m) \cdot X_R(m)^H$$

$$= \begin{bmatrix} X_{R1}(m) \cdot X_{R1}(m)^* & \cdots & X_{R1}(m) \cdot X_{Rj}(m)^* & \cdots & X_{R1}(m) \cdot X_{RK}(m)^* \\ \vdots & & \vdots & & \vdots \\ X_{Ri}(m) \cdot X_{R1}(m)^* & \cdots & X_{Ri}(m) \cdot X_{Rj}(m)^* & \cdots & X_{Ri}(m) \cdot X_{RK}(m)^* \\ \vdots & & \vdots & & \vdots \\ X_{RK}(m) \cdot X_{R1}(m)^* & \cdots & X_{RK}(m) \cdot X_{Rj}(m)^* & \cdots & X_{RK}(m) \cdot X_{RK}(m)^* \end{bmatrix}$$

As a method of calculating the sample correlation matrix, a section average type and an exponential smoothing type are well-known.

In the method of the section average, an average value between correlation matrix observation values of snapshots which continues predetermined SSN [times] is used as the sample correlation matrix. A number of sampling SSN [times] for equalization relates to S/N improvement. If SSN becomes bigger, influence of noise in an observation signal is removed, so that S/N improves. One of methods of calculating is shown hereinafter.

[Expression 7]

$$C_{xx}(m) = \frac{1}{SSN} \sum_{j=0}^{SSN-1} R_{tmp\_xx}(m-j) \quad (7)$$

Although the above-mentioned refers to a case where the sample correlation matrix is renewed, synchronizing with the snapshot, the renewal cycle may be once SSN snapshot times. In such a case, the sample correlation matrix is renewed as shown hereinafter.

[Expression 8]

$$C_{xx}(m') = \frac{1}{SSN} \sum_{j=1}^{SSN} R_{tmp\_xx}(SSN \cdot (m'-1) + j) \quad (8)$$

where Cxx(m') means the sample correlation matrix in the m'-th snapshot.

The method of the exponential smoothing is one for obtaining a renewed sample correlation matrix by respectively weighting the sample correlation matrix of the last snapshot and the correlation matrix observation value which is obtained in the present snapshot and adding both. A weight on the sample correlation matrix of the last snapshot is referred to as a forgetting factor, and is represented by α. At this time, a weight on the observation value of the correlation matrix which is obtained in the present snapshot is 1-α. A method of calculating with exponential smoothing is shown hereinafter.

[Expression 9]

$$C_{xx}(m) = \alpha \cdot C_{xx}(m-1) + (1-\alpha) \cdot R_{tmp\_xx}(m) \quad (9)$$

The number of sampling SSN [times] for equalization in the section average method which has been mentioned before and the forgetting factor α have the following relation as shown hereinafter in view of dispersion of the estimated value.

[Expression 10]

$$\alpha = \frac{SSN - 1}{SSN + 1} \quad (10)$$

Expression 10 is introduced by such a condition that dispersion of the element of the sample correlation matrix is equal in the section average method and the exponential smoothing method if each element of the observation value of the correlation matrix conform to a chi-square distribution of degree of freedom 2, but this is not detailedly mentioned. Then, SSN is made bigger as α approximates 1, so that the effect of the S/N improvement is made bigger. Therefore, the forgetting factor α is a parameter for adjusting the S/N improvement.

If Expression 9 is accepted as an IIR filter, a transient response performance on a change of the observation value of the correlation matrix is made better when α approximates zero (0), so that the forgetting factor α is a parameter for adjusting the transient response performance.

In the power estimating means according to the maximum likelihood method as shown in FIG. 2, the sample correlation matrix Cxx, an observation noise power PN, and reflected wave arrival azimuths θ1, θ2, . . . , θD (number of reflected waves: D) are inputted, and the estimated values PS1, m1, . . . , PS2, m1 . . . PSD, m1 of the respective reflected wave power PS1, PS2, . . . , PSD are estimated according to the maximum likelihood method.

Concretely speaking, by determining an array response matrix V from the reflected wave arrival azimuths θ1, θ2, . . . , 74 D and calculating the next expression, a maximum likelihood estimated value Sf, m1 of the signal covariance matrix and the estimated values PS1, m1, PS2, m1, . . . , PSD, m1 of the respective reflected wave powers are obtained.

[Expression 11]

$$S_{f,m1} = (V^H V)^{-1} V^H [C_{xx} - P_N I] V (V^H V)^{-1}$$

$$[PS_{1,m1} \ldots PS_{D,m1}] = \text{diag}(S_{f,m1}) \quad (11)$$

where diag means a process to extract a diagonal element, and H means a conjugate transpose.

In the power estimating means of the array radar apparatus 1 as shown in FIG. 2, observation noise power PN, number of reflected waves D, and the reflected wave arrival azimuths θ1, θ2, . . . , θD are explained as predetermined. But, some array radar apparatus may calculate observation noise power PN, number of reflected waves D, and reflected wave arrival azimuths θ1, θ2, . . . , θD from the sample correlation matrix Cxx. For instance, in a known method of deciding number of reflected waves D, this is determined from characteristic values of the sample correlation matrix with information standard, such as AIC or MDL, (see document: "OPTIMUM ARRAY PROCESSING Part IV of Detection, Estimation, and Modulation Theory", Harry L. VanTrees, p. 830, 2002). And, in a known method of deciding the observation noise power PN, the characteristic values of the sample correlation matrix are arranged in a descending order, as λ1>λ2> . . . λD>λD+1 . . . >λ K and an average value between λD+1 and λK is determined as the observation noise power PN (see document: "OPTIMUM ARRAY PROCESSING Part IV of Detection, Estimation, and Modulation Theory", Harry L. Van Trees, p. 1000, 2002). And, in a known method of deciding the reflected wave arrival azimuths θ1, θ2, . . . , θD, a pseudo angular power spectrum Pq (θ) is computed from the sample correlation matrix so as to be determined. The pseudo angular power spectrum shows an angular distribution of the pseudo power, and Pq (θ) shows the pseudo power which arrives from the azimuth θ, including an error. Known computing methods of the pseudo angular power spectrum are MUSIC, ESPRIT and the like (see document "Adaptive antenna technique" which has been published on Oct. 10, 2003 by Ohmsha written by Nobuo KIKUMA). The reflected wave is considered to arrive from an angle where the spectral intensity is intense in the pseudo angular power spectrum, so that a target is decided to be in this azimuth. In case of the pseudo angular power spectrum Pq(θ) as shown in FIG. 5, for instance, the arrival azimuth of the reflected wave is predicted to be at θ1, θ2 and θ3 [°] where spectrum strength is high.

Subsequently, it will now be briefly explained that output of Expression 11 becomes the estimated value by the maximum likelihood method, referring to document: "OPTIMUM ARRAY PROCESSING Part IV of Detection, Estimation, and Modulation Theory", Harry L. Van Trees, p. 984~, 2002.

The observation signal component vector XR is modeled by the array response matrix V, a signal component vector of reflected wave F, and observation noise vector N in the next expression.

[Expression 12]

$$XR = V \cdot F + N$$

$$V \triangleq [v(\theta_1) \ldots v(\theta_D)]$$

$$F \triangleq [s_1, \ldots, s_D]^T \quad (12)$$

where v(θ) represents the array response vector and corresponds to the response at the time when emitting the reflected wave from arrival azimuth θ on the array radar. For instance, the array response vector of the linear array having K number of components which element interval is d is given by the next expression when a phase center is placed at the center of the array.

[Expression 13]

$$v(\theta) = \begin{bmatrix} \exp\left(-j\frac{2\pi}{\lambda}d\left(\frac{K-1}{2}\right)\sin\theta\right) \\ \exp\left(-j\frac{2\pi}{\lambda}d\left(\frac{K-3}{2}\right)\sin\theta\right) \\ \vdots \\ \exp\left(j\frac{2\pi}{\lambda}d\left(\frac{K-3}{2}\right)\sin\theta\right) \\ \exp\left(j\frac{2\pi}{\lambda}d\left(\frac{K-1}{2}\right)\sin\theta\right) \end{bmatrix} \quad (13)$$

$\lambda$ is a wave length of reflected wave. The observation noise N and the observation noise power PN having the following relation.

[Expression 14]

$$E[N \cdot N^H] = P_N I \quad (14)$$

s1~sD represent the respective signal components of the reflected waves of the arrival azimuths $\theta$ 1~$\theta$D. A signal covariance matrix Sf is defined by the next expression.

[Expression 15]

$$S_f = E[F \cdot F^H] \quad (15)$$

The signal covariance matrix Sf and the powers PS1, PS2, ..., PSD of the respective reflected waves have the following relation. Therefore, in the estimation of power according to the maximum likelihood method, the object is to estimate the signal covariance matrix Sf.

[Expression 16]

$$S_f = \begin{bmatrix} PS_1 & \cdots & \cdots \\ \cdots & \ddots & \cdots \\ \cdots & \cdots & PS_D \end{bmatrix} \quad (16)$$

$$[PS_1 \ldots PS_D] = \mathrm{diag}(S_f)$$

where diag( ) represents the process to extract the diagonal element from the matrix.

If the observation signal component vector XR is the random number of the complex Gaussian process, a conditional probability density distribution P(XR/Sf) of the observation signal component vector XR is given by the next expression.

[Expression 17]

$$P(X_R \mid S_f) = \frac{1}{\det[\pi R_{xx}]} \exp\{-(X_R - E[X_R])^H R_{xx}^{-1}(X_R - E[X_R])\} \quad (17)$$

Therefore, a log likelihood function L(Sf) is given by the next expression.

[Expression 18]

$$L(S_f) \stackrel{\Delta}{=}$$

$$\ln P(X_R \mid S_f) = \ln\left(\frac{1}{\det[\pi R_{xx}]} \exp\{-(X_R - E[X_R])^H R_{xx}^{-1}(X_R - E[X_R])\}\right) \quad (18)$$

In the estimation of power according to the maximum likelihood method, the signal covariance matrix Sf which maximum is the likelihood function L(Sf) is obtained under the conditions of expressions 12 through 15 if observation noise power PN, number of reflected waves D, and arrival azimuths of reflected waves $\theta$1, $\theta$2, ..., $\theta$D are given, and the powers PS1, PS2, ..., PSD of the respective reflected waves are obtained from the Expression 15 with the obtained signal covariance matrix Sf as the maximum likelihood estimate Sf,m1. Supposing that E [XR] is not related to Sf and L (Sf) is transformed, the next expression is obtained.

[Expression 19]

$$L(S_f) = -\ln \det[R_{xx}] - tr(R_{xx}^{-1} C_{xx}) \quad (19)$$

where tr( ) represents the process to sum up the diagonal elements. In such a condition that L(Sf) is maximum,

[Expression 20]

$$\left.\frac{\partial L(S_f)}{\partial S_{ij}}\right|_{S_f = S_{f,ml}} = 0, \; i, j = 1, 2, \ldots, D \quad (20)$$

where Sij is the component with i-th row and j-th column of the signal covariance matrix Sf. A partial differentiation by Sij of the first term of Expression 19 is given by the next expression.

[Expression 21]

$$\frac{\partial \ln \det[R_{xx}]}{\partial S_{ij}} = tr[v^H(\theta_i) R_{xx}^{-1} v(\theta_j)] \quad (21)$$

The second term is given by the next expression.

[Expression 22]

$$\frac{\partial tr[R_{xx}^{-1} C_{xx}]}{\partial S_{ij}} = tr[-v^H(\theta_i) R_{xx}^{-1} C_{xx} R_{xx} v(\theta_j)] \quad (22)$$

Therefore, the requirement of Expression 20 is

[Expression 23]

$$v^H(\theta_i)[R_{xx}^{-1} C_{xx} R_{xx} - R_{xx}^{-1}] v(\theta_j) = 0, \; i,j=1,2,\ldots D \quad (23)$$

or

[Expression 24]

$$V^H[R_{xx}^{-1} C_{xx} R_{xx} - R_{xx}^{-1}] V = 0 \quad (24)$$

From the following Expression 25 obtained from Expressions 12, 14, and 15,

[Expression 25]

$$R_{xx} = V S_f V^H + P_N I \quad (25)$$

the following expression is obtained.

[Expression 26]

$$R_{xx}^{-1} = \frac{1}{P_N}[I - V[S_f V^H V + P_N I]^{-1} S_f V^H] \quad (26)$$

Therefore, when transforming Expression 24 with Expression 26, the next expression is obtained.

[Expression 27]

$$[S_f V^H V + P_N I]^{-1} V^H [C_{xx} - R_{xx}] V [S_f V^H V + P_N I]^{-1} = 0 \quad (27)$$

As a necessary and sufficient condition for formation of Expression 27, the next expression is obtained.

[Expression 28]

$$V^H [C_{xx} - R_{xx}] V = 0 \quad (28)$$

Substituting Expression 25 for Expression 28, the following expression is obtained.

[Expression 29]

$$(V^H V) S_f (V^H V) = V^H [C_{xx} - P_N I] V \quad (29)$$

Since the array response matrix V, the sample correlation matrix Cxx, and the observation noise power PN are already known in Expression 29, Sf the maximum of which is the likelihood function is a value which satisfys the linear matrix equation in Expression 28. When showing Expression 29 as the matrix element again,

[Expression 30]

$$\begin{bmatrix} & & & q\text{-th column} & & \\ & & & \vdots & & \\ p\text{-th row} & \cdots & \cdots & \sum_{i=1\ldots D} \sum_{j=1\ldots D} v(\theta_p)^H v(\theta_i) S_{ij} v(\theta_j)^H v(\theta_q) & \cdots & \cdots \\ & & & \vdots & & \\ & & & \vdots & & \end{bmatrix} = \begin{bmatrix} & & \vdots & & \\ & & \vdots & & \\ \cdots & \cdots & v(\theta_p)^H [C_{xx} - P_N I] v(\theta_q) & \cdots & \cdots \\ & & \vdots & & \\ & & \vdots & & \end{bmatrix} \quad (30)$$

Sij is the element of i-th row and j-th column of Sf

In other words, in the power estimation according to the maximum likelihood method, the estimated value is obtained by solving the simultaneous equations in the number of square of D which is combination of the respective elements in p rows and q columns (p=1 . . . D, q=1 . . . D) as shown in Expression 30 for variables Sij i=1 . . . D, j=1 . . . D. In Expression 11, an inverse matrix of $V^H V$ is calculated from the array response matrix to be determined in Expression 12, and Sf satisfying Expression 29, that is, the maximum likelihood estimate Sf,m1, is obtained.

The above-mentioned is the structure of the power estimating portion of the vehicle-mounted array radar apparatus. In the array radar apparatus for collision avoidance and traveling maintaining inter-vehicle distance, real-time processing at high speed is required by its nature.

In estimation of power according to the maximum likelihood method with Expression 11, but, it may be difficult to embody because of the operation of inverse matrix with large computation. The computation volume of the inverse matrix operation according to the Gaussian elimination method is indicated in Table 1. When thinking multiplication having a number of operation times and large amount of computer resources as a standard, computing amount, a cube of matrix order is necessary for the operation of inverse matrix.

[Expression 11]

$$S_{f,m1} = (V^H V)^{-1} V^H [C_{xx} - P_N I] V (V^H V)^{-1}$$

$$[PS_{1,m1} \ldots PS_{D,m1}] = \text{diag}(S_{f,m1}) \quad (11)$$

TABLE 1

Computing Volume for Inverse Matrix of Matrix having n orders (Case of Gaussian Elimination Method)

| Operator | Computing volume (times) | Order |
|---|---|---|
| Addition and Subtraction | $4/3 \cdot n^3 - 3/2 \cdot n^2 + 1/6 \cdot n$ | $0(n^3)$ |
| Multiplication | $4/3 \cdot n^3 - 3/2 \cdot n^2 + 1/6 \cdot n$ | $0(n^3)$ |
| Division | $3/2 \cdot n^2 - 1/2 \cdot n$ | $0(n^2)$ |

The invention provides the radar signal processor having a power estimating means for reducing computing volume by introducing the approximating expression which is obtained by simplifying Expression 11, for real-time processing.

SUMMARY OF THE INVENTION

Figure 1:
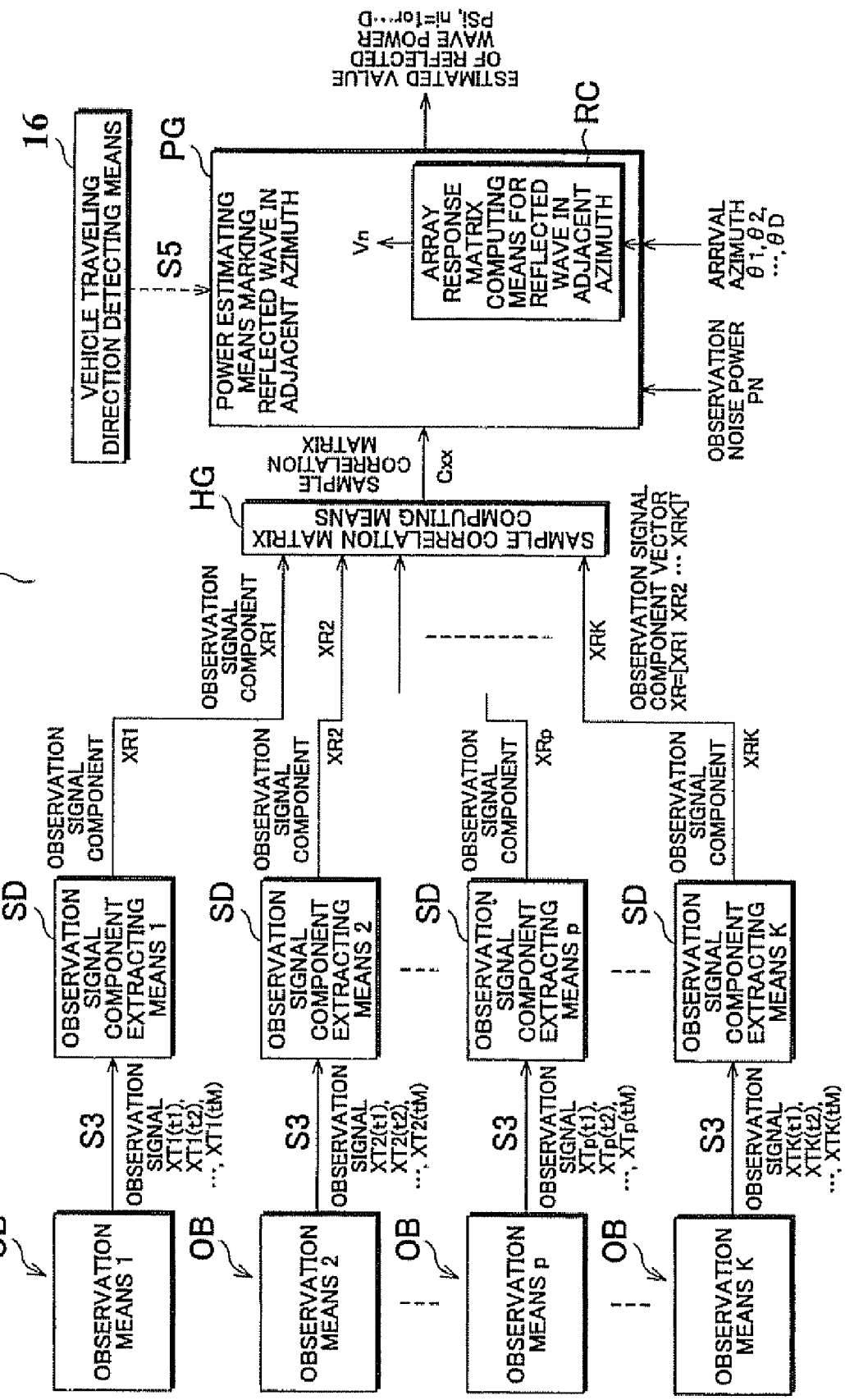
FIG. 1 is a block diagram showing a schematic structure of a power estimating portion of a vehicle-mounted array radar apparatus which is a first embodiment of the invention.

One aspect of the invention is radar signal processor, comprising:
two or more observation means, each observation means having an array element for catching a reflected wave from a target and for outputting a predetermined observation signal from said reflected wave caught by said array element;
observation signal component extracting means for extracting an observation signal component concerning said target from said observation signals outputted from each said observation means;
sample correlation matrix computing means for computing a sample correlation matrix showing a correlation characteristic between said observation means which is a sample value of a correlation matrix from said observation signal components corresponding to said respective observation means, which have been extracted by said observation signal component extracting means; and power estimating means for estimating power of said reflected wave in a predetermined arrival direction from said sample correlation matrix computed by said sample correlation matrix computing means, an array response matrix which is computed on the basis of an arrival directions of said caught reflected waves, being comprised of response vectors of said reflected waves caught by said array elements, and an observation noise power given in advance;

said power estimating means having adjacent azimuth array response matrix computing means for selecting said reflected wave in said predetermined arrival direction power of which is to be estimated and a reflected wave in an azimuth adjacent to said arrival direction of said reflected wave and for computing and determining said array response matrix as an adjacent azimuth array response matrix, said adjacent azimuth array response matrix having only said reflected wave of said predetermined arrival direction and said reflected wave in an azimuth adjacent to said arrival direction of said reflected wave as elements;

whereby said power estimating means estimates power of said reflected wave in said predetermined arrival direction on the basis of said adjacent azimuth array response matrix computed by said adjacent azimuth array response matrix computing means.

According to this aspect of the invention, the adjacent azimuth array response matrix, limiting elements to the reflected waves in the azimuths adjacent to each other, is used, so that the order of the inverse matrix when obtaining the signal covariance matrix (Sf) can be made smaller and the computing volume can be reduced. This aspect of the invention is optimum for the radar signal processor of the vehicle-mounted radar apparatus to which arithmetic processing in a shorter time is expected although high-function CPU capacity can not be used therefor.

Another aspect of the invention is the radar signal processor, wherein said adjacent azimuth array response matrix computing means has adjacent reflected wave selecting means for selecting predetermined number of reflected waves in order of adjacency of said reflected wave power of which is to be estimated when selecting said reflected waves in an azimuth adjacent to said arrival direction of said reflected wave power of which is to be estimated, and said adjacent azimuth array response matrix computing means computes and determines said adjacent azimuth array response matrix which has only said reflected wave power of which is to be estimated and said reflected wave selected by said adjacent reflected wave selecting means as elements.

According to this aspect of the invention, the reflected waves to be used as the elements of the adjacent azimuth array response matrix are limited to a predetermined number of the reflected waves adjacent to the reflected wave power of which is to be estimated, so that the adjacent azimuth array response matrix can be easily computed and determined. Besides, the computing volume by the CPU (computer) can be reduced, and a tradeoff between simplification of computing and increase of errors can be adjusted by adjusting the number of the reflected waves to be selected.

Another aspect of the invention is the radar signal processor, wherein said adjacent azimuth array response matrix computing means has adjacent reflected wave selecting means for selecting said reflected waves which exist within a predetermined azimuth difference with respect to said reflected wave power of which is to be estimated when selecting said reflected wave in an azimuth adjacent to said arrival direction of reflected wave power of which is to be estimated, and said adjacent azimuth array response matrix computing means computes and determines said adjacent azimuth array response matrix which has only said reflected wave power of which is to be estimated and said reflected wave selected by said adjacent reflected wave selecting means as elements.

According to this aspect of the invention, the reflected waves to be used as the elements of the adjacent azimuth array response matrix are limited to ones which exist within a predetermined azimuth difference with respect to the reflected wave power of which is to be estimated, so that the adjacent azimuth array response matrix can be easily computed and determined. Besides, the computing volume by the CPU (computer) can be reduced, and a tradeoff between simplification of computing and increase of errors can be adjusted by properly adjusting a value of the difference of the azimuth.

Another aspect of the invention is the radar signal processor, wherein said adjacent azimuth array response matrix computing means has adjacent reflected wave selecting means for selecting said reflected wave meeting such a condition that an inner product between said array response vectors of said reflected wave to be selected and said reflected wave power of which is to be estimated is a predetermined value or more when selecting said reflected waves in an azimuth adjacent to said arrival direction of reflected wave power of which is to be estimated, and said adjacent azimuth array response matrix computing means computes and determines said adjacent azimuth array response matrix which has only said reflected wave power of which is to be estimated and said reflected wave selected by said adjacent reflected wave selecting means as elements.

According to this aspect of the invention, the reflected waves to be used as the elements of the adjacent azimuth array response matrix are limited to ones meeting such a condition that the inner product between the array response vectors of the reflected wave to be obtained and the reflected wave power of which is to be estimated is a predetermined value or more, so that the computing volume by the CPU (computer) can be reduced, and a tradeoff between simplification of computing and increase of errors can be adjusted.

Another aspect of the invention is the radar signal processor, further comprising reflected wave grouping means for classifying said reflected waves into two or more groups from said arrival directions of said caught reflected waves, each group being comprised of said reflected waves which exist within a difference of said azimuths adjacent to each other, wherein said adjacent azimuth array response matrix computing means computes and determines said adjacent azimuth array response matrix from only said reflected waves comprising said group for each said group which has been classified by said reflected wave grouping means, whereby estimating powers of said reflected waves belonging to said group for each of said two or more groups.

According to this aspect of the invention, the caught reflected waves are classified, and the powers of the reflected waves belonging to each group can be estimated for each group, so that the power of the reflected wave can be estimated within a shorter time even if there are a lot of reflected waves.

DESCRIPTION OF THE PREFERRED EMBODIMENTS

First Embodiment

The vehicle-mounted array radar apparatus 1 is comprised of the observation means OBs: 1 through K, the observation signal component extracting means SDs: 1 through K, the sample correlation matrix computing means HG and the power estimating means marking reflected wave in adjacent azimuth PG, as shown in FIG. 1. The array radar apparatus 1 may be provided with a vehicle traveling direction detecting means 16 for computing a traveling direction of a vehicle from an angle of a steering or positioning information of a GPS, connecting with the power estimating means marking reflected wave in adjacent azimuth PG, if necessary. Respective blocks in FIG. 1 only shows functions exercised by the array radar apparatus 1, and do not always means individual hardwares. Each block, or two or more functioning blocks which are united with each other may be operated through a computer and program executed thereby on the basis of a predetermined operation clock by a multi-task with a passage of time.

Figure 2:
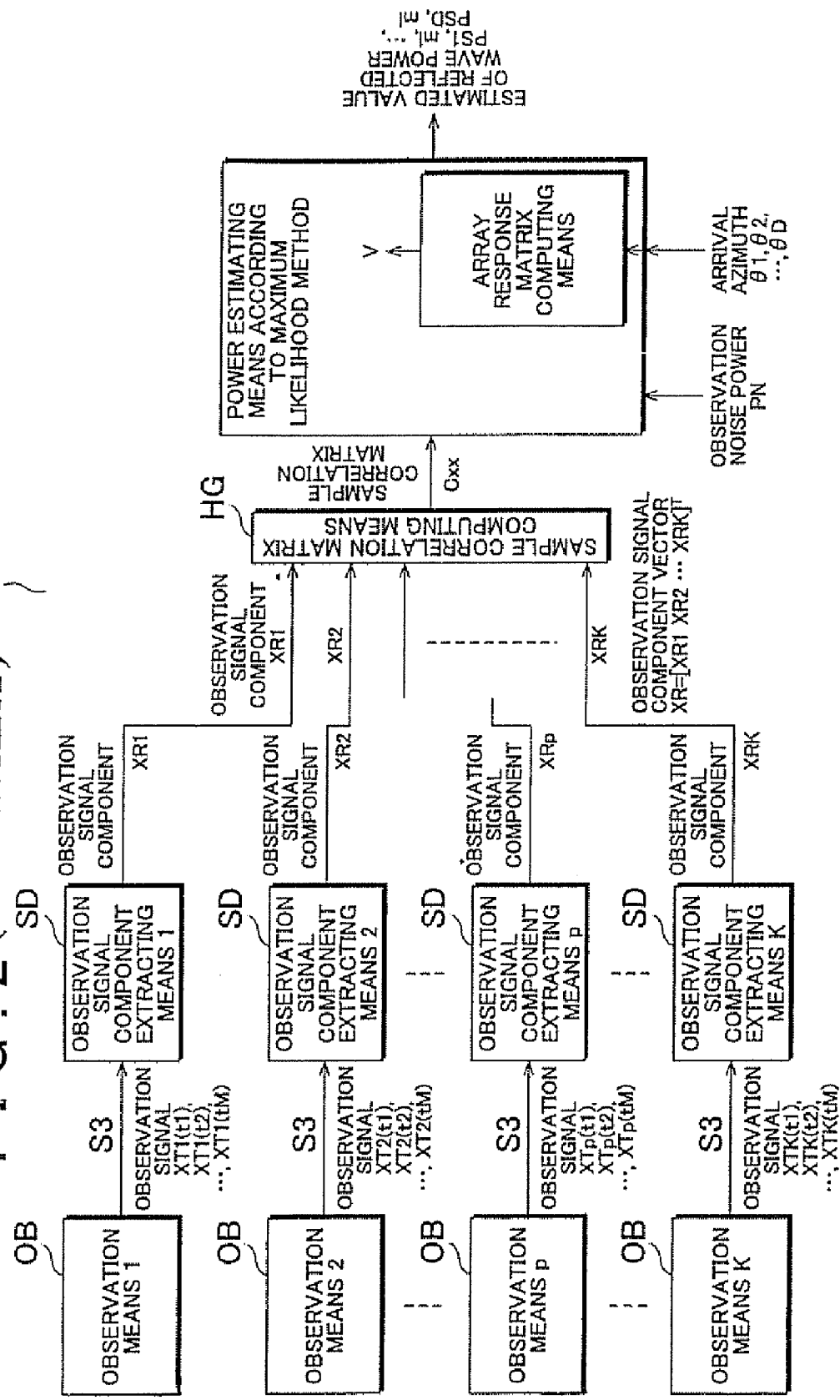
FIG. 2 is a block diagram showing a schematic structure of a power estimating portion of a conventional vehicle-mounted array radar apparatus.
Figure 3:
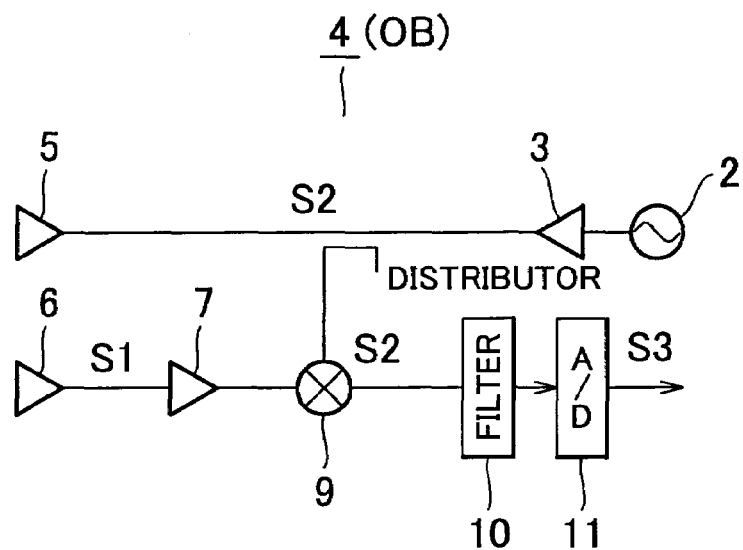
FIG. 3 is a view showing a structure of a FM-CW radar which is an instance of observation means.
Figure 4:
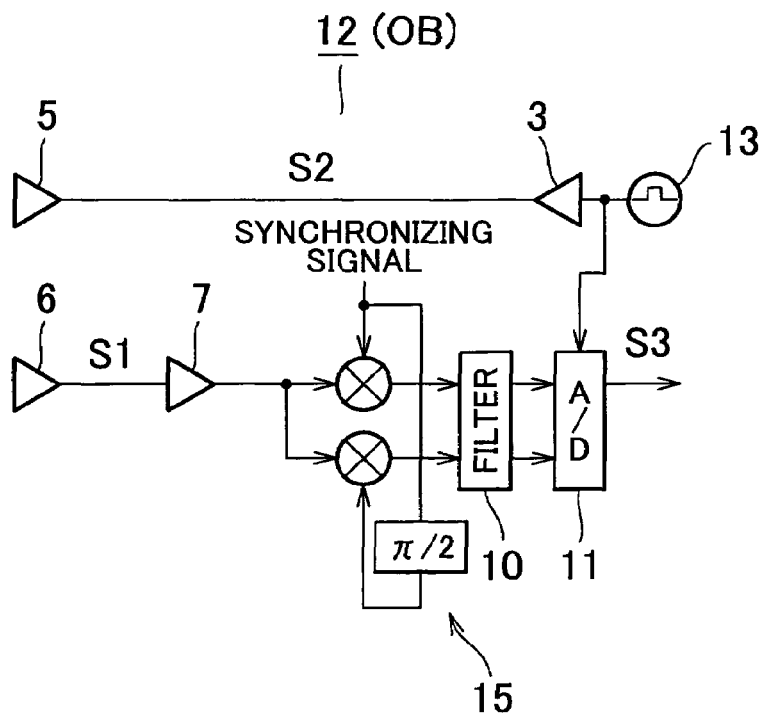
FIG. 4 is a view showing a structure of a pulse radar which is an instance of the observation means.
Figure 5:
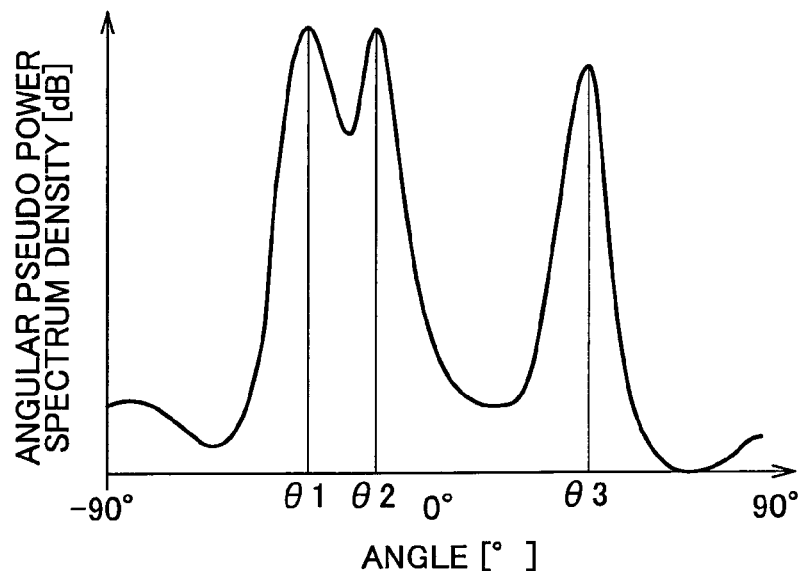
FIG. 5 is a view showing an instance of a pseudo angular power spectrum.

Explanations on the observation means OB: p (array element p=1, 2, ... K), the observation signal component extracting means SD: p (array element p=1, 2, ... K), and the sample correlation matrix computing means HG are omitted since these are similar to ones in the power estimating portion of the conventional array radar apparatus in FIG. 2.

In the power estimating means marking reflected wave in adjacent azimuth PG, sample correlation matrix Cxx, observation noise power PN, arrival azimuths of reflected waves θ1, θ2, ... θD (number of reflected waves: D) are inputted, and estimated value Psi, n of power Psi of the i-th reflected wave is estimated from array response matrix of reflected wave in adjacent azimuth Vn according to the approximation computing method of the maximum likely method.

Array response matrix computing means for reflected wave in adjacent azimuth RC within the power estimating means marking reflected wave in adjacent azimuth PG determines the array response matrix of reflected wave in adjacent azimuth Vn defined by the following expression, being comprised of the array response vectors of the reflected waves $1_1, \ldots, 1d$ in the azimuth adjacent to the reflected wave i (the i-th reflected wave which is selected optionally or under a predetermined standard) from the arrival azimuths of reflected waves θ1, θ2, ....

[Expression 31]

$$V_n \triangleq [v(\theta_i)|v(\theta_{l_1}) \ldots v(\theta_{ld})] \neq V \quad (31)$$

Subsequently, the estimated value Psi, n of the power PS of the reflected wave is computed on the basis of the following expression with the array response matrix of reflected wave in adjacent azimuth Vn.

[Expression 32]

$$S_{f,n} = (V_n^H V_n)^{-1} V_n^H [C_{xx} - P_N I] V_n (V_n^H V_n)^{-1}$$

$$PS_{i,n} = S_{f,n}(1,1) \quad (32)i$$

where Sf,n is an estimated value of a signal covariance matrix between the reflected waves i, $1_1, \ldots 1d$, and Sf,n(1,1) is an element in the first row in the first column thereof.

It is necessary to compute the inverse matrix of order D of $(V^H V)$ in estimation of power according to the maximum likely method. But, it is sufficient to compute the inverse matrix of order d+1 of $(V_n^H V_n)$ in order to estimate power of a specific reflected wave according to the present invention. As shown in Table 1, computation volume of the inverse matrix is the order of a cube of order, and d+1<D, so that the computation volume can be reduced according to the invention.

And, it is shown that Expression 32 is an approximative operation of Expression 11 in the power estimating method according to the maximum likely method. For easy understanding, a case where the reflected wave in adjacent azimuth is one is explained. Then, the array response matrix of reflected wave in adjacent azimuth Vn is shown below.

[Expression 33]

$$V_n \triangleq [v(\theta_i)|v(\theta_{l_1})] \quad (33)$$

An inner product $v(\theta p)^H v(\theta q)$ between the array response vectors have the following nature wherein the inner product is large if a difference of the azimuth is small and the inner product is small if the difference of the azimuth is large.

[Expression 34]

$$\theta_p < \theta_q \Rightarrow v(\theta_p)^H v(\theta_q) \cong 0$$

$$\theta_p \cong \theta_q \Rightarrow v(\theta_p)^H v(\theta_q) >> 0$$

$$\theta_p > \theta_q \Rightarrow v(\theta_p)^H v(\theta_q) \cong 0 \quad (34)$$

Figure 7:
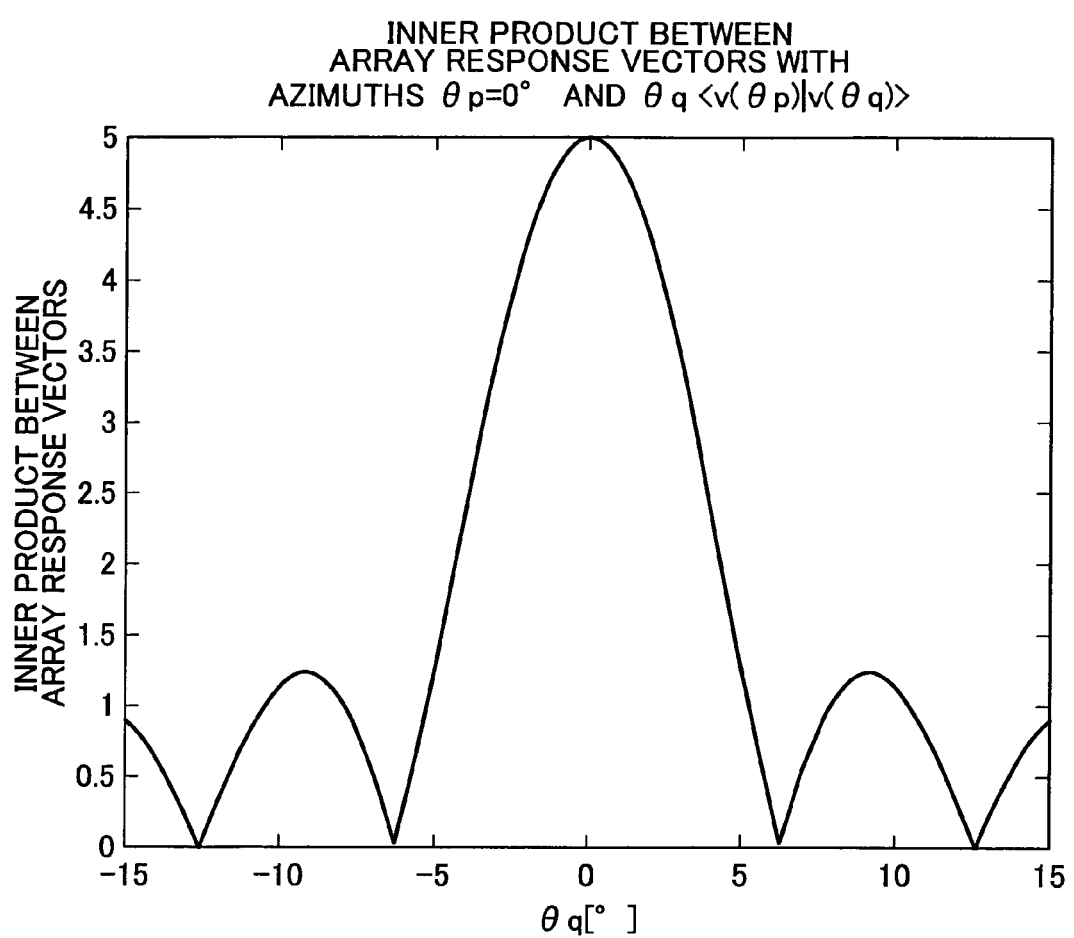
FIG. 7 is a view showing an instance of a graph of an inner product between array response vectors.

For reference, the inner product between the array response vectors in a case where θp is fixed at 0° and θq is changed is shown with a graph where number of elements K=5, interval of elements d=7.2 [mm] and wavelength λ=3.9 [mm] in FIG. 7.

Since the i-th reflected wave and the $1_1$-th reflected wave are widely different from the other reflected waves in the azimuth with the nature of Expression 34, the following Expression 35 is obtained.

[Expression 35]

$$j \neq i \text{ and } j \neq l_1 \Rightarrow v(\theta_i)^H v(\theta_j) \cong 0 \text{ and } v(\theta_{l_1})^H v(\theta_j) \cong 0 \quad (35)$$

Using the approximation of Expression 35, the respective elements of i-th row and i-th column, i-th row and $1_1$-th column, $1_1$-th row and i-th column, and $1_1$-th row and $1_1$-th column in the left side of Expression 30 are approximated as shown below.

[Expression 36]

$$\begin{bmatrix} \ldots & v(\theta_i)^H \left( [v(\theta_i) v(\theta_{l_1})] \begin{bmatrix} S_{ii} & S_{il_1} \\ S_{l_1 i} & S_{l_1 l_1} \end{bmatrix} \begin{bmatrix} v(\theta_i)^H \\ v(\theta_{l_1})^H \end{bmatrix} \right) v(\theta_i) & \ldots & v(\theta_i)^H \left( [v(\theta_i) v(\theta_{l_1})] \begin{bmatrix} S_{ii} & S_{il_1} \\ S_{l_1 i} & S_{l_1 l_1} \end{bmatrix} \begin{bmatrix} v(\theta_i)^H \\ v(\theta_{l_1})^H \end{bmatrix} \right) v(\theta_{l_1}) \\ & \vdots & & \vdots \\ \ldots & v(\theta_{l_1})^H \left( [v(\theta_i) v(\theta_{l_1})] \begin{bmatrix} S_{ii} & S_{il_1} \\ S_{l_1 i} & S_{l_1 l_1} \end{bmatrix} \begin{bmatrix} v(\theta_i)^H \\ v(\theta_{l_1})^H \end{bmatrix} \right) v(\theta_i) & \ldots & v(\theta_{l_1})^H \left( [v(\theta_i) v(\theta_{l_1})] \begin{bmatrix} S_{ii} & S_{il_1} \\ S_{l_1 i} & S_{l_1 l_1} \end{bmatrix} \begin{bmatrix} v(\theta_i)^H \\ v(\theta_{l_1})^H \end{bmatrix} \right) v(\theta_{l_1}) \\ & \vdots & & \vdots \end{bmatrix} \quad (36)$$

The elements of i-th row and i-th column, i-th row and $1_1$-th column, $1_1$-th row and i-th column, and $1_1$-th row and $1_1$-th column of Expression 36 contain as parameters only Sf elements related to i and $1_j$, Sii, Si$1_1$, S$1_1$i, and S$1_1$$1_1$. Meanwhile, the elements excluding i-th row and i-th column, i-th row and $1_1$-th column, $1_1$-th row and i-th column, and $1_1$-th row and $1_1$-th column don't contain Sf element related to i and $1_1$ by the approximation of Expression 35. For instance, the element of 1-st row and 1-st column in the case of i≠1, $1_1$≠1 is shown below.

[Expression 37]

$$v(\theta_1)^H \left( \sum_{\substack{p=1\ldots D \\ p\neq i \\ p\neq l_1}} \sum_{\substack{q=1\ldots D \\ q\neq i \\ q\neq l_1}} v(\theta_i) S_{ij} v(\theta_j)^H \right) v(\theta_1) \tag{37}$$

Therefore, Sf element related to i and $1_1$, Sii, Si$1_1$, S$1_1$i, and S$1_1$$1_1$ are independently determined only by a simultaneous equation of i-th row and i-th column, i-th row and $1_1$-th column, $1_1$-th row and i-th column, and $1_1$-th row and $1_1$-th column of Expression 36. Transposing the elements of i-th row and i-th column, i-th row and $1_1$-th column, $1_1$-th row and i-th column, and $1_1$-th row and $1_1$-th column from Expression 36 to left side, taking the corresponding elements from Expression 30 for right side, and arranging in the shape of a matrix equation, the following expression is obtained.

[Expression 38]

$$\begin{bmatrix} v(\theta_i)^H \left( [v(\theta_i) \; v(\theta_{1_1})] \begin{bmatrix} S_{ii} & S_{i1_1} \\ S_{1_1 i} & S_{1_1 1_1} \end{bmatrix} \begin{bmatrix} v(\theta_i)^H \\ v(\theta_{1_1})^H \end{bmatrix} \right) v(\theta_i) & v(\theta_i)^H \left( [v(\theta_i) \; v(\theta_{1_1})] \begin{bmatrix} S_{ii} & S_{i1_1} \\ S_{1_1 i} & S_{1_1 1_1} \end{bmatrix} \begin{bmatrix} v(\theta_i)^H \\ v(\theta_{1_1})^H \end{bmatrix} \right) v(\theta_{1_1}) \\ v(\theta_{1_1})^H \left( [v(\theta_i) \; v(\theta_{1_1})] \begin{bmatrix} S_{ii} & S_{i1_1} \\ S_{1_1 i} & S_{1_1 1_1} \end{bmatrix} \begin{bmatrix} v(\theta_i)^H \\ v(\theta_{1_1})^H \end{bmatrix} \right) v(\theta_i) & v(\theta_{1_1})^H \left( [v(\theta_i) \; v(\theta_{1_1})] \begin{bmatrix} S_{ii} & S_{i1_1} \\ S_{1_1 i} & S_{1_1 1_1} \end{bmatrix} \begin{bmatrix} v(\theta_i)^H \\ v(\theta_{1_1})^H \end{bmatrix} \right) v(\theta_{1_1}) \end{bmatrix} = \tag{38}$$

$$\begin{bmatrix} v(\theta_i)^H [C_{xx} - P_N I] v(\theta_1) & v(\theta_1)^H [C_{xx} - P_N I] v(\theta_{1_1}) \\ v(\theta_{1_1})^H [C_{xx} - P_N I] v(\theta_1) & v(\theta_{1_1})^H [C_{xx} - P_N I] v(\theta_{1_1}) \end{bmatrix}$$

Rearranging Expression 38, the following expression is obtained.

[Expression 39]

$$\begin{bmatrix} v(\theta_i)^H \\ v(\theta_{1_1})^H \end{bmatrix} [v(\theta_i) \; v(\theta_{1_1})] \begin{bmatrix} S_{ii} & S_{i1_1} \\ S_{1_1 i} & S_{1_1 1_1} \end{bmatrix} \begin{bmatrix} v(\theta_i)^H \\ v(\theta_{1_1})^H \end{bmatrix} [v(\theta_i) \; v(\theta_{1_1})] = \tag{39}$$

$$\begin{bmatrix} v(\theta_i)^H \\ v(\theta_{1_1})^H \end{bmatrix} [C_{xx} - P_N I] [v(\theta_i) \; v(\theta_{1_1})]$$

Furthermore, substituting the array response matrix for reflected wave in adjacent azimuth Vn in Expression 33 for Expression 39, the following form similar to Expression 29 is obtained.

[Expression 40]

$$(V_n^H V_n) \begin{bmatrix} S_{ii} & S_{i1_1} \\ S_{1_1 i} & S_{1_1 1_1} \end{bmatrix} (V_n^H V_n) = V_n^H [C_{xx} - P_N I] V_n \tag{40}$$

Therefore, the power according to the maximum likelihood method of Expression 29 in consideration of the approximation with Expression 35 is estimated by solving the simultaneous equation of Expression 40. In solving Expression 40, to use the inverse matrix of ($V_n^H V_n$) is a processing mode of this aspect of the invention indicated in Expression 32 (see the following expression).

[Expression 41]

$$S_{f,n} = \begin{bmatrix} S_{ii} & S_{i1_1} \\ S_{1_1 i} & S_{1_1 1_1} \end{bmatrix} \triangleq (V_n^H V_n)^{-1} V_n^H [C_{xx} - P_N I] V_n (V_n^H V_n)^{-1} \tag{41}$$

$$PS_{1,n} = S_{f,n}(1, 1)$$

Next, effectiveness of this aspect of the invention will be indicated with values. The following case is thought.

Figure 6:
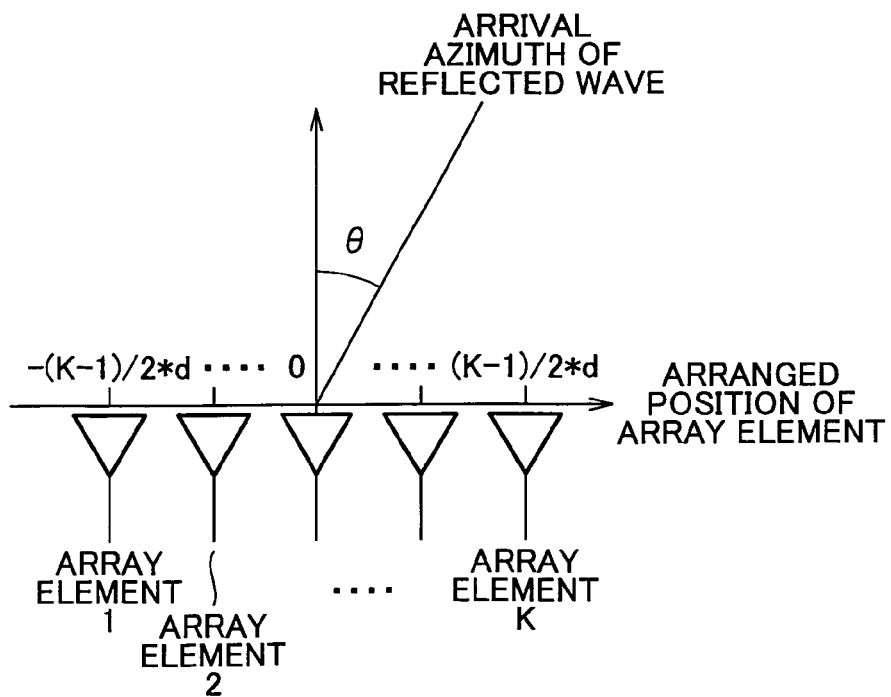
FIG. 6 is a schematic diagram of K elements of linear array having equal element interval d.

Antenna Linear array having equal interval in FIG. 6
Element number K=5
Element interval d=7.2 [mm]
Wave length λ=3.9 [mm]
Number of reflected wave D=3
Azimuth of reflected wave θ1=0.0°, θ2=5.0°, θ3=14.0°
Sample correlation matrix

[Expression 42]

$$C_{xx} = \begin{bmatrix} 301.0 & 59.7-118.8i & 133.8-25.9i & -48.8-99.4i & 53.0+175.7i \\ 59.7+118.8i & 301.0 & 59.7-118.8i & 133.8-25.9i & -48.8-99.4i \\ 133.8+25.9i & 59.7+118.8i & 301.0 & 59.7-118.8i & 133.8-25.9i \\ -48.8+99.4i & 133.8+25.9i & 59.7+118.8i & 301.0 & 59.7-118.8i \\ 53.0-175.7i & -48.8+99.4i & 133.8+25.9i & 59.7+118.8i & 301.0 \end{bmatrix} \qquad (42)$$

Observation noise power PN=0 [dB]=1.0 [W]
Correct value of power of reflected wave
PS1=20 [dB]=100.0 [W], PS2=20 [dB]=100.0 [W], PS3=20 [dB]=100.0 [W]

At this time, estimating the power of the reflected wave 1 (azimuth $\theta 1=0°$) is thought.

First, the estimated value in conventional method in Expression 11 is as follows.

[Expression 43]

$$\begin{aligned} S_{f,ml} &= (V^H V)^{-1} V^H [C_{xx} - P_N I] V (V^H V)^{-1} \\ &= \begin{bmatrix} 100.0 & 0.0 & 0.0 \\ 0.0 & 100.0 & 0.0 \\ 0.0 & 0.0 & 100.0 \end{bmatrix} [PS_{1,ml} \ PS_{2,ml} \ PS_{3,ml}] \\ &= \operatorname{diag}(S_{f,ml}) \\ &= [100.0 \ 100.0 \ 100.0] \end{aligned} \qquad (43)$$

Secondly, the estimated value of this aspect of the invention is obtained. If the reflected wave in the azimuth adjacent to azimuth of the reflected wave 1 is a reflected wave 2 (azimuth $\theta 2=5.0°$), the array response matrix for reflected wave in adjacent azimuth Vn is shown below.

[Expression 44]

$$V_n \triangleq [v(0°) \, v(5°)] \qquad (44)$$

Then, the following estimated value is obtained.

[Expression 45]

$$\begin{aligned} S_{f,n} &= \begin{bmatrix} S_{ii} & S_{il_1} \\ S_{l_1 i} & S_{l_1 l_1} \end{bmatrix} \triangleq (V_n^H V_n)^{-1} V_n^H [C_{xx} - P_N I] V_n (V_n^H V_n)^{-1} \\ &= \begin{bmatrix} 104.1 & -6.0 \\ -6.0 & 108.9 \end{bmatrix} \end{aligned} \qquad (45)$$

$$PS_{i,n} = S_{f,n}(1,1) = 104.1 \ [W]$$

The power estimated value of the reflected wave 1 in a conventional method in Expression 11 is 100.0 [W], the power estimated value in this aspect of the invention is 104.1 [W], so that it is confirmed that a correct estimation is possible with 4% error or so.

Second Embodiment

Another embodiment of the invention is explained hereinafter. A schematic structure of this embodiment is similar to one of the embodiment of FIG. 1. And, structural elements excluding the array response matrix computing means for reflected wave in adjacent azimuth RC inside the power estimating means marking reflected wave in adjacent azimuth PG are similar to ones in the embodiment of FIG. 1, so that the explanation is omitted.

In this aspect of the invention, the array response matrix computing means for reflected wave in adjacent azimuth RC selects a predetermined number Th of the reflected waves in order of adjacence to the reflected wave i which is a subject for power estimation, and determines the array response matrix for reflected wave in adjacent azimuth Vn having these array response vectors as elements.

For instance, when the azimuth of the reflected wave is $\theta 1=0.0°$, $\theta 2=5.0°$, $\theta 3=14.0°$, and $\theta 4=-10.0°$ and Th=2, the case of estimation of the power of the reflected wave 1 will be explained as an example. Arranging the azimuths of the reflected waves in order of adjacence to $\theta 1$, the order is $\theta 2$, $\theta 4$, and $\theta 3$. Then, the array response matrix for reflected wave in adjacent azimuth Vn is as follows.

[Expression 46]

$$V_n \triangleq [v(\theta_1) | v(\theta_2) v(\theta_4)] = [v(0.0°) v(5.0°) v(-10.0°)] \qquad (46)$$

Since $(V_n^H V_n)$ is a matrix having order Th+1, computing volume which is necessary for the inverse matrix operation in Expression 32 is monotonically increasing function of Th. Therefore, in this aspect of the invention, the power is estimated with full computing volume determined by parameter Th with the best efforts.

Third Embodiment

Another embodiment of the invention is explained hereinafter. A schematic structure of this embodiment is similar to one of the embodiment of FIG. 1. And, structural elements excluding the array response matrix computing means for reflected wave in adjacent azimuth RC inside the power estimating means marking reflected wave in adjacent azimuth PG are similar to ones in the embodiment of FIG. 1, so that the explanation is omitted.

In this aspect of the invention, the array response matrix computing means for reflected wave in adjacent azimuth RC selects the reflected waves approximating a predetermined azimuth difference $\Delta\theta$ with respect to a reflected wave i which is a subject for power estimation, that is, the reflected waves which exist within a predetermined azimuth difference $\Delta\theta$ with respect to the reflected wave i, and determines the array response matrix for reflected wave in adjacent azimuth Vn having these array response vectors as elements.

For instance, when the azimuth of the reflected wave is $\theta 1=0.0°$, $\theta 2=5.0°$, $\theta 3=14.0°$, and $\Delta\theta=5.0°$ (The azimuth difference may be positive angle or negative angle with respect to the reflected wave i which is a subject for power estimation. And the azimuth difference having the different angle in positive and negative, such as $-3.0°\sim+4.0°$, may be taken.), the case that the power of the reflected wave is estimated will be explained as an example. In this case, the array response matrix for reflected wave in adjacent azimuth Vn is as follows.

[Expression 47]

$$V_n \triangleq [v(\theta_1)|v(\theta_2)] = [v(0.0°)v(5.0°)] \quad (47)$$

Expression 32 is evolved in such a manner that the property of Expression 34 is used and the following Expression 35 is used under such a condition that the inner product between the array response vectors of the reflected waves which are not adjacent to each other is regarded as zero (0).

[Expression 35]

$$j \ne i \text{ and } j \ne l_1 \Rightarrow v(\theta_i)^H v(\theta_j) \cong 0 \text{ and } v(\theta_{ij})^H v(\theta_j) \cong 0 \quad (35)$$

Figure 8:
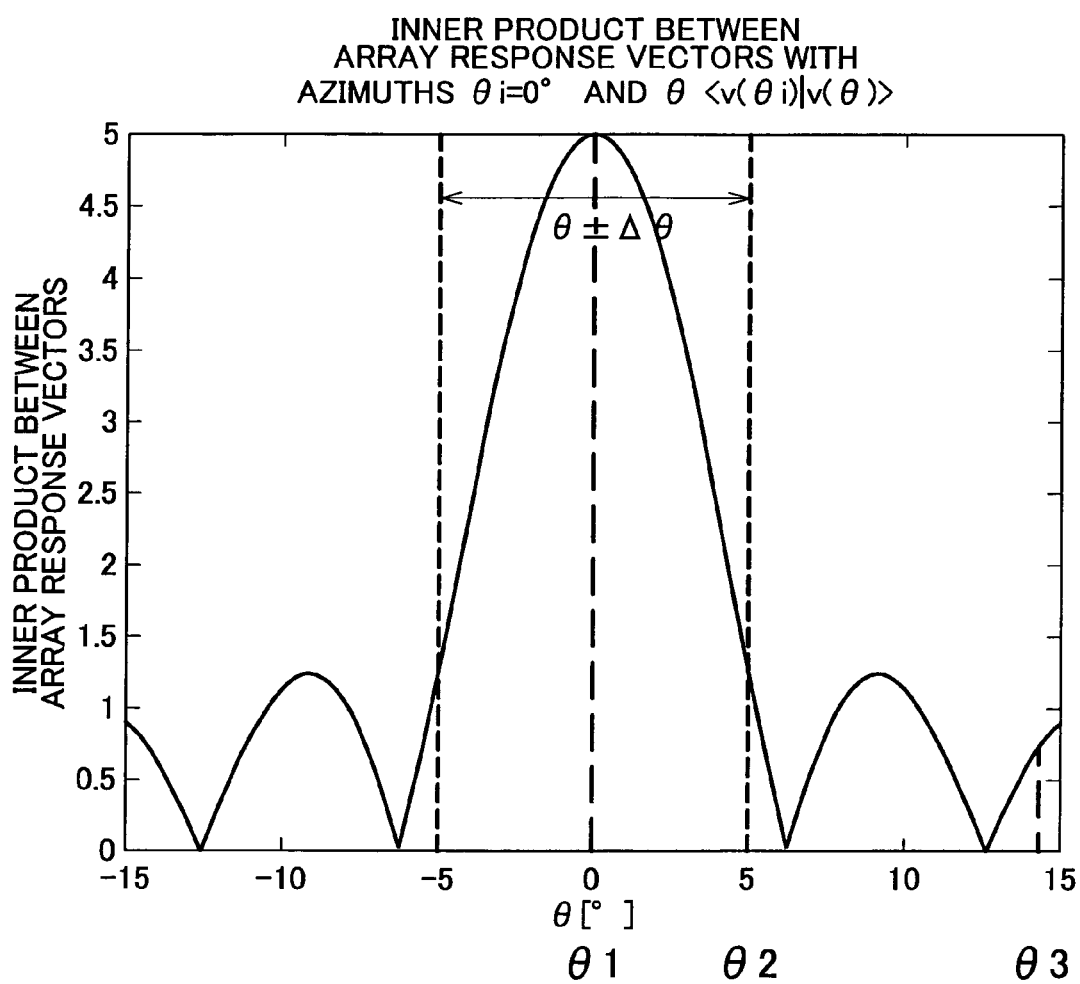
FIG. 8 is a view for explaining the inner product between the array response vectors in a third embodiment of the invention.

In this aspect of the invention, the azimuth of the reflected wave wherein the inner product is regarded as zero is determined by the parameter azimuth difference $\Delta\theta$. The inner product between the array response vectors in such a case is shown in FIG. 8. As shown in FIG. 8, the inner product with $v(\theta)$ sufficiently approaching $\theta=0°$ is about five (5), but the inner product at the time when reaching the azimuth difference 5° is made small, so that an influence of this array response vector in Expression 30 is made small. If the parameter azimuth difference $\Delta\theta$ is made larger, the reflected wave which inner product is small is also included in the array response matrix for reflected wave in adjacent azimuth Vn, so that Expression 32 approaches the power estimating expression before approximation and the accuracy of estimation improves. If the parameter azimuth difference $\Delta\theta$ is made smaller, the reflected wave which inner product is regarded as zero increases, and the accuracy of estimation is lowered due to an increase of the different points with the power estimating expression before approximation. But, the computing volume reduces since the order of $(V_n^H V_n)$ is made small. The effects of this aspect of the invention is that the trade-off between the accuracy of estimation and the computing volume can thus adjusted by the parameter, the difference azimuth $\Delta\theta$.

Fourth Embodiment

Another embodiment of the invention is explained hereinafter. A schematic structure of this embodiment is similar to one of the embodiment of FIG. 1. And, structural elements excluding the array response matrix computing means for reflected wave in adjacent azimuth RC inside the power estimating means marking reflected wave in adjacent azimuth PG are similar to ones in the embodiment of FIG. 1, so that the explanation is omitted.

In this aspect of the invention, the array response matrix computing means for reflected wave in adjacent azimuth RC selects the reflected wave meeting such a condition that the inner product between the array response vectors of the reflected wave i which is a subject for power estimation and the reflected wave to be obtained is a predetermined value Ti or more, and determines the array response matrix for reflected wave in adjacent azimuth Vn having these array response vectors as elements.

In this aspect of the invention, in the below-mentioned invention with the azimuth difference $\Delta\theta$ as a parameter, the azimuth difference is changed into the inner product between the array response vectors.

Figure 9:
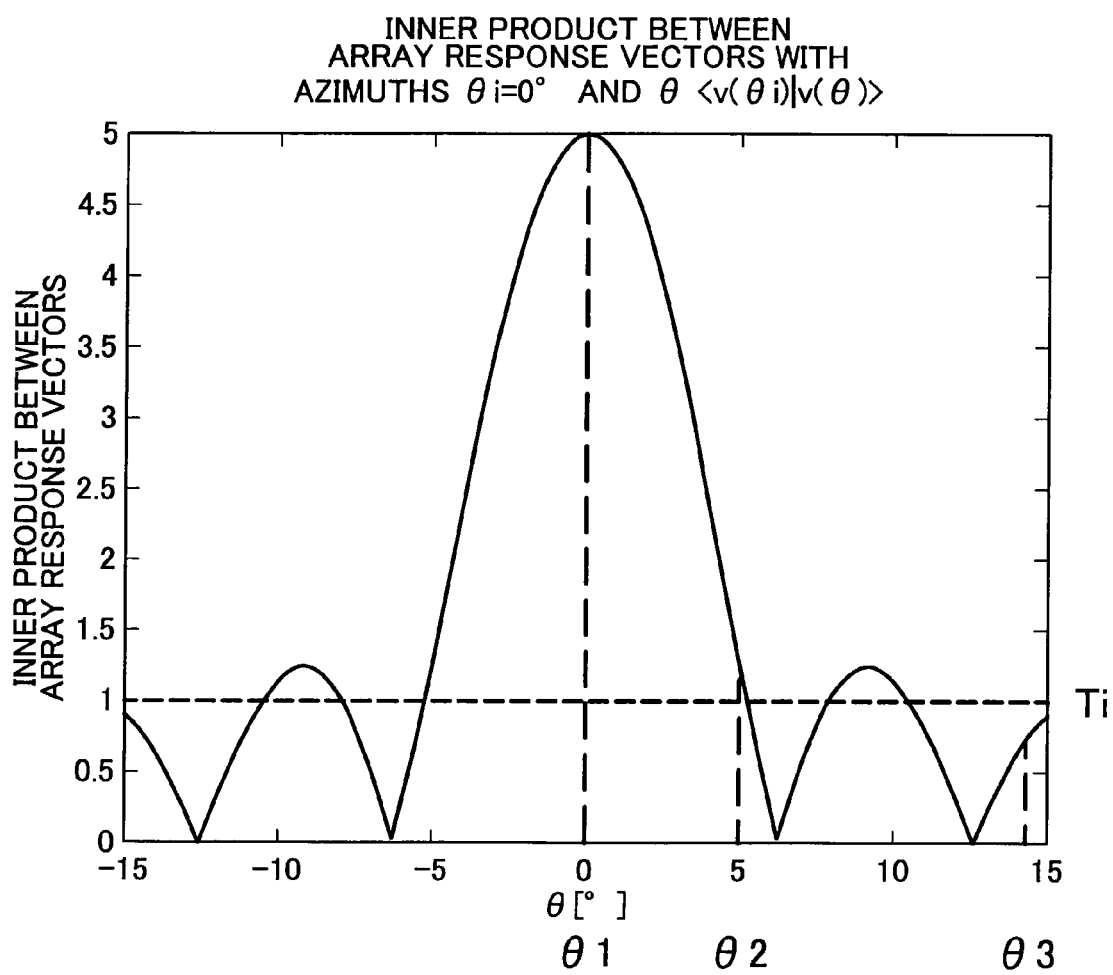
FIG. 9 is a view for explaining the inner product between the array response vectors in a fourth embodiment of the invention.

For instance, a case of power estimation of reflected wave 1 where the azimuth of the reflected wave $\theta 1=0.0°$, $\theta 2=5.0°$, $\theta 3=14.0°$ and $Ti=1.0$ will now be explained. In this case, the inner product between the array response vectors is shown in FIG. 9, so that the array response matrix for reflected wave in adjacent azimuth Vn is shown below.

[Expression 48]

$$V_n \triangleq [v(\theta_1)|v(\theta_2)] = [v(0.0°)v(5.0°)] \quad (48)$$

In this aspect of the invention, a threshold value Ti for regarding the inner product as zero (0) is determined with respect to a size of the inner product. If the threshold value Ti is made smaller, the reflected wave which inner product is small is also included in the array response matrix for reflected wave in adjacent azimuth Vn, so that Expression 32 approaches the power estimating expression prior to approximation and the accuracy of estimation improves. If the threshold value Ti is made larger, on the other hand, the reflected waves which inner products are regarded as zero (0) increase, and the difference points with the power estimating expression prior to approximation increase. Then, the accuracy of estimation is lowered, but the computing volume is reduced since the order of $(V_n^H V_n)$ is made small. The effects of the invention is that the trade-off between the accuracy of estimation and the computing volume can be adjusted by the threshold value Ti of the inner product between the array response vectors which is a parameter. In this aspect of the invention, the reflected waves are selected directly by the inner product between the array response vectors, so that this aspect of the invention is effectively applied even in a side lobe area as shown in FIG. 9 wherein the relation between the azimuth difference and the inner product is not monotonous.

Figure 10:
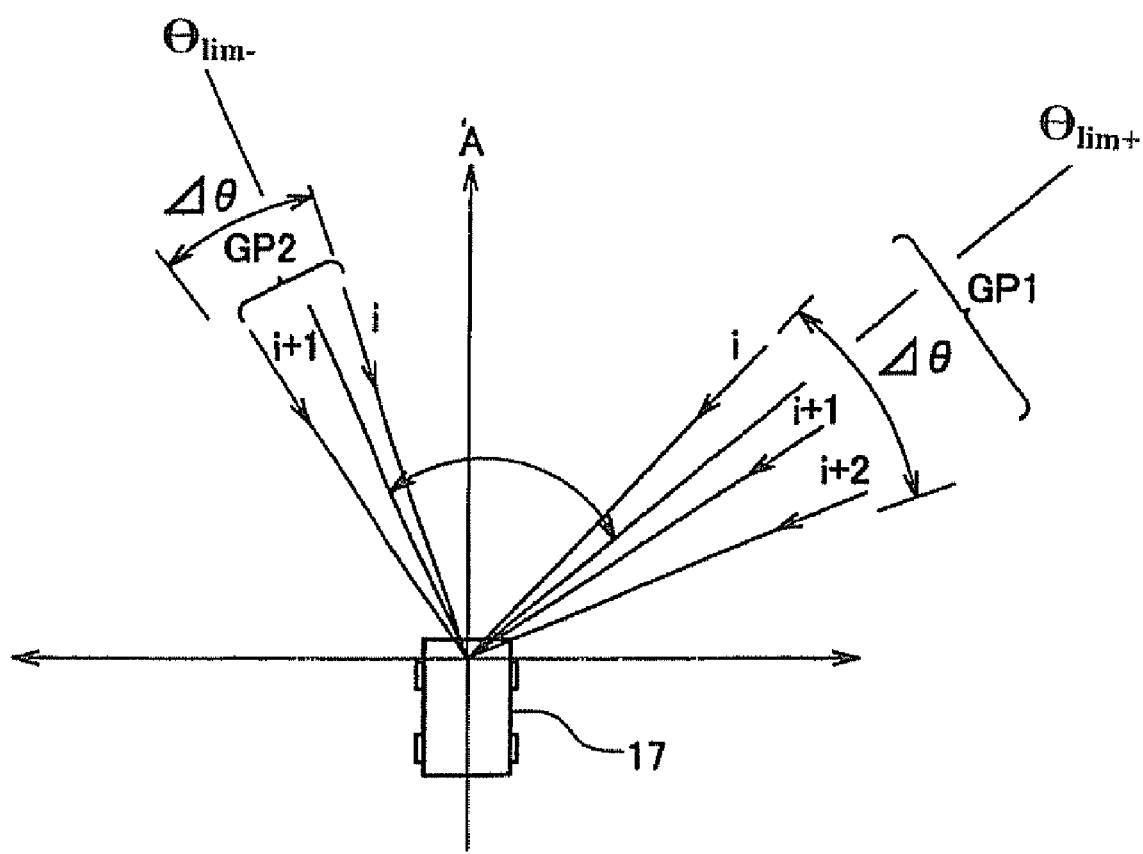
FIG. 10 is a typical view showing a traveling direction of a vehicle and an arrival azimuth of a reflected wave.

It is sufficient that the i-th reflected wave i which is a subject for power estimation exists in a predetermined angle $[\theta_{1im-}\theta_{1im+}]$ with respect to a front direction A which a front face of a vehicle 17 faces as shown in FIG. 10, and the i-th reflected wave does not always exist in the front direction of the vehicle 17 ($\theta=0°$), but can have an optional angle $\theta$ with respect to the front direction A of the vehicle 17.

Fifth Embodiment

Another method of estimating powers of the reflected waves can be also adopted. That is, when selecting the i-th reflected waves which are subjects for estimation of power from two or more reflected waves arrival azimuths of which are computed in advance with a well-known method, predetermined reflected waves i which exist within a predetermined angular bounds $[\theta_{1im-}\theta_{1im+}]$ between an azimuth searching upper limit for power estimation subject $\theta_{1im+}$ and an azimuth searching lower limit for power estimation subject $\theta_{1im-}$ are selected in a front direction A (standard direction) which a front of the vehicle 17 faces as shown in FIG. 10, and the reflected waves adjacent to each other with respect to the reflected wave i, that is, the reflected waves i+1, i+2, ... which exist within predetermined azimuth difference $\Delta\theta$ are selected and thus selected reflected waves are classified into two or more reflected wave groups GP1, GP2, ..., and the powers of the respective reflected waves i, i+1, i+2 which comprises each of the reflected wave groups GP1, GP2, ... are estimated and computed for each of the reflected wave groups GP1, GP2, ... into which the reflected waves adjacent to each other are classified. When thus classifying the reflected waves into the groups, the power of a target on right and left road shoulders in a front direction of a traveling vehicle can be selectively searched within a shorter time with smaller computing volume.

Preferably, the predetermined angular bounds $[\theta_{1im-}\theta_{1im+}]$ is determined on the basis of a traveling direction signal S5 from the vehicle traveling direction detecting means RD as shown in FIG. 1 which shows an operation angle of a steering, showing a present traveling direction of a vehicle, and the i-th reflected waves which are subjects for power estimation are selected or the size of the predetermined azimuth difference $\Delta\theta$ is determined.

The invention can be utilized for a machine for estimating power of arrival waves in a vehicle-mounted array radar apparatus having two or more antenna elements.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A reflected wave power estimation device for a radar signal processor, comprising:
    two or more observation means, each observation means having an array element for catching a reflected wave from a target and for outputting a predetermined observation signal from said caught reflected wave;
    observation signal component extracting means for extracting an observation signal component concerning said target from said observation signals outputted from each said observation means;
    sample correlation matrix computing means for computing a sample correlation matrix showing a correlation characteristic between said observation means, said sample correlation matrix being a sample value of a correlation matrix from said extracted observation signal components corresponding to said respective observation means; and
    power estimating means for estimating power of a reflected wave in a predetermined arrival direction from said sample correlation matrix, an array response matrix which is computed on the basis of arrival directions of said caught reflected waves, said array response matrix being comprised of response vectors of said caught reflected waves and an observation noise power given in advance, eliminating an influence of said reflected waves on said reflected wave in said predetermined arrival direction, and for outputting the estimated power outside as a reflected power estimation value;
    said power estimating means having adjacent azimuth array response matrix computing means for selecting said reflected wave in said predetermined arrival direction and a reflected wave in an azimuth adjacent to said predetermined arrival direction and for computing and determining said array response matrix as an adjacent azimuth array response matrix, said adjacent azimuth array response matrix having only said reflected wave of said predetermined arrival direction and said reflected wave in said azimuth adjacent to said predetermined arrival direction as elements;
    whereby said power estimating means estimates power of said reflected wave in said predetermined arrival direction on the basis of said adjacent azimuth array response matrix computed by said adjacent azimuth array response matrix computing means.

2. The reflected wave power estimation device according to claim 1, wherein said adjacent azimuth array response matrix computing means has adjacent reflected wave selecting means for selecting predetermined number of reflected waves in order of adjacency of said reflected wave in said predetermined arrival direction.

3. The reflected wave power estimation device according to claim 1, wherein said adjacent azimuth array response matrix computing means has adjacent reflected wave selecting means for selecting said reflected waves which exist within a predetermined azimuth difference with respect to said reflected wave in said predetermined arrival direction.

4. The reflected wave power estimation device according to claim 1, wherein said adjacent azimuth array response matrix computing means has adjacent reflected wave selecting means for selecting said reflected waves, meeting such a condition that an inner product between said array response vectors of said reflected wave to be selected and said reflected wave in said predetermined arrival direction is a predetermined value or more.

5. The reflected wave power estimation device according to claim 1, further comprising reflected wave grouping means for classifying said reflected waves into two or more groups from said arrival directions of said caught reflected waves, each group being comprised of said reflected waves which exist within a difference of said azimuths adjacent to each other, wherein said adjacent azimuth array response matrix computing means computes and determines said adjacent azimuth array response matrix from only said reflected waves comprising said group for each said group which has been classified by said reflected wave grouping means, whereby estimating powers of said reflected waves belonging to said group for each of said two or more groups.

6. A reflected wave power estimation device for a radar signal processor comprising:
    two or more observation means, each observation means adapted to catch a reflected wave from a target and output a predetermined observation signal based on said caught reflected wave;
    observation signal component extracting means for extracting an observation signal component relating to said target from said observation signals;
    sample correlation matrix computing means for computing a sample correlation matrix based on a sample value of a correlation matrix from said extracted observation signal components;
    power estimating means for estimating power of a reflected wave in a predetermined arrival direction from said sample correlation matrix, an array response matrix which is computed on the basis of arrival directions of said caught reflected waves, said array response matrix comprising response vectors of said caught reflected waves and an observation noise power given in advance, eliminating influence of said reflected waves on said reflected wave in said predetermined arrival direction;
    said power estimating means having adjacent azimuth array response matrix computing means for selecting said reflected wave in said predetermined arrival direction and a reflected wave in an azimuth adjacent to said predetermined arrival direction and for computing said array response matrix as an adjacent azimuth array response matrix, said adjacent azimuth array response matrix having only said reflected wave of said predetermined arrival direction and said reflected wave in said azimuth adjacent to said predetermined arrival direction as elements; and whereby said power estimating means estimates power of said reflected wave in said predetermined arrival direction on the basis of said adjacent azimuth array response matrix computed by said adjacent azimuth array response matrix computing means.

* * * * *